United States Patent [19]

Yonemoto

[11] Patent Number: 4,713,595
[45] Date of Patent: Dec. 15, 1987

[54] CONTROL APPARATUS FOR ELEVATOR

[75] Inventor: Masashi Yonemoto, Inazawa, Japan

[73] Assignee: Mitsubishi Denki Kabushiki Kaisha, Japan

[21] Appl. No.: 885,761

[22] Filed: Jul. 15, 1986

[30] Foreign Application Priority Data

Jul. 19, 1985 [JP] Japan .................................. 60-159564

[51] Int. Cl.⁴ ............................ H02P 3/18; B66B 1/32
[52] U.S. Cl. ...................................... 318/759; 187/119
[58] Field of Search ................................ 318/757-762; 187/119, 112

[56] References Cited

U.S. PATENT DOCUMENTS

| | | | |
|---|---|---|---|
| 4,471,419 | 9/1984 | Schneider et al. | 318/807 |
| 4,475,631 | 10/1984 | Nomura | 318/759 |
| 4,503,940 | 3/1985 | Watanabe | 318/809 |
| 4,545,464 | 10/1985 | Nomura | 318/807 |
| 4,559,549 | 7/1986 | Muton et al. | 318/806 |
| 4,625,159 | 11/1986 | Ikejima | 318/811 |
| 4,667,777 | 5/1987 | Nomura | 318/811 |

FOREIGN PATENT DOCUMENTS 59-17879  1/1984  Japan .

Primary Examiner—David Smith, Jr.
Attorney, Agent, or Firm—Leydig, Voit & Mayer

[57] ABSTRACT

In an elevator driven by an induction motor and having a slip control device for generating a slip frequency command signal on the basis of an error between a speed command value and a running speed value of the induction motor so as to control a VVVF type inverter which in turn provides a corresponding alternating current of variable voltage and frequency, the inverter having a smoothing capacitor on a D-C side thereof, a control apparatus for stabilizing torque of the induction motor by smoothly changing operation of the induction motor from a powering mode to a regenerative mode, the control apparatus comprising a current detector for detecting charging current of the smoothing capacitor having a portion for detecting polarity of the slip frequency command signal and a unit responsive to the charging current detected by the current detector and the slip frequency command signal generated by the slip control device for changing operation of the induction motor from the powering mode to the regenerative mode only when a voltage value based on the charging current has exceeded a preset reference voltage value after a negative sign of the slip frequency command signal is detected by the polarity detection portion.

7 Claims, 4 Drawing Figures

CONTROL APPARATUS FOR ELEVATOR

BACKGROUND OF THE INVENTION

This invention relates to improvements in a control apparatus for an elevator which is driven by an induction motor.

In a control apparatus for an elevator of the system wherein a commercial alternating current is converted into a direct current value by a converter, whereupon the direct current is inverted by an inverter into an alternating current of variable voltage and variable frequency with which an induction motor for hoisting a cage is driven, a method according to which regenerative power generated by the hoisting induction motor for the elevator cage is consumed within the induction motor has been proposed in Japanese patent application Laid-open Nos. 59-17879.

According to this document, in the powering mode of the elevator, the torque of the motor is controlled by the so-called "slip frequency control", while in the regenerative mode, control is performed so as to consume the regenerative power within the induction motor. The powering and the regeneration are changed-over when a slip frequency command signal has become zero.

FIGS. 4(a)–4(d) are characteristics diagrams showing the relationships between the operating speed v of the elevator and the slip frequency command signal $f_3$. In FIG. 4(a) illustrative of the operating speed v of the elevator, the cage is started at a time $t=0$ and is accelerated to reach its full speed at $t=t_1$. Subsequently, when the cage has come to a deceleration initiation point at $t=t_2$, it begins to be decelerated, and it arrives at a destination floor at $t=t_3$. As is well known, a counterweight corresponding to about 50% of a rated movable load is usually used in an elevator. Therefore, in a case where the cage is upwardly run carrying a load near the rated movable load, the slip frequency command signal $f_s$ continues to be zero during the deceleration as shown in FIG. 4(b). (Note: Strictly speaking, the slip frequency command signal $f_s$ is determined by the movable load, the acceleration and the moment of inertia.) In addition, in a case where the cage is run under a load equal to about half of the rated movable load, the slip frequency command signal $f_s$ continues to be zero during the full-speed running as shown in FIG. 4(c). Besides, the slip frequency command signal $f_s$ can continue to be zero during the acceleration in a case where the cage is downwardly run near the rated load, during the acceleration in a case where it is upwardly run near the no-load state thereof, or during the deceleration in a case where it is downwardly run near the no-load state thereof.

In general, the slip frequency command signal $f_s$ is instantly changed-over from plus to minus or vice versa as shown in FIG. 4(d). As stated above, however, the periods during which the slip frequency command signal continues to be zero exist under the specified conditions.

With the prior-art control apparatus for the elevator, the change-over between the powering and the regeneration is executed when the slip frequency command signal is zero. Therefore, when the slip frequency command signal continues to be zero, the change-over between the powering and the regeneration arises frequently, and the torque of the motor becomes unstable. As a result, the comfort of riders in the elevator is reduced.

SUMMARY OF THE INVENTION

This invention has the objective to eliminate the problem mentioned above, and has for its main object to provide an elevator wherein the change-over between powering and regeneration is smoothly executed to stabilize the torque of a motor, thereby providing a comfortable ride.

A control apparatus for an elevator according to this invention comprises a circuit which detects a magnitude of regenerative power, whereby a powering mode is changed-over to a regenerative mode on the basis of the condition of AND between the polarity of a slip frequency command signal and the detected magnitude of regenerative power.

With the control apparatus for an elevator in this invention, the powering mode is changed-over to the regenerative mode when the generation of a predetermined magnitude of regenerative power has been detected after the change of the slip frequency command signal from plus to minus.

BRIEF DESCRIPTION OF THE DRAWINGS

FIG. 3(a) is a characteristic diagram showing the relationship between a slip frequency command signal and the operation time of a motor, while FIG. 3(b) is a response characteristic diagram of regenerative power at the detection of a regenerative mode.

PREFERRED EMBODIMENT OF THE INVENTION

Figure 1:
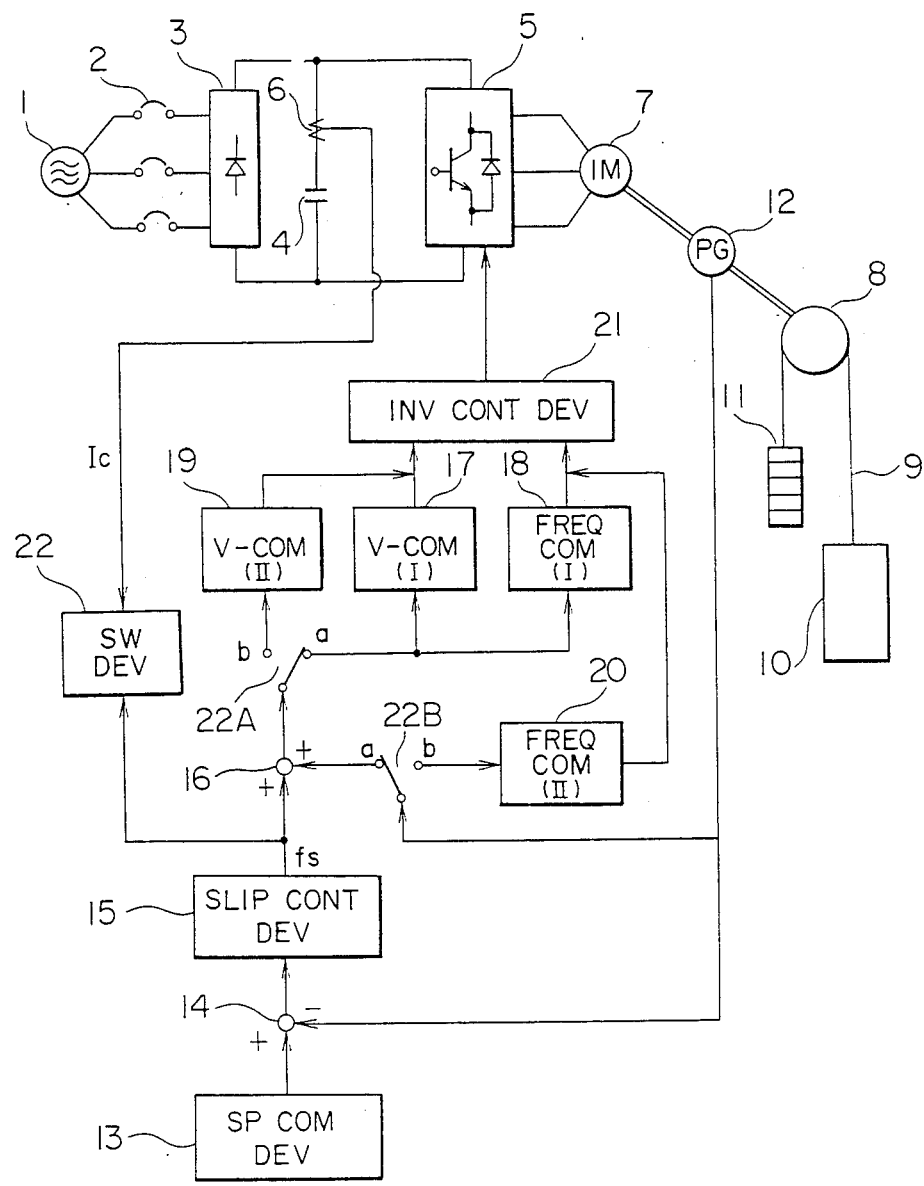
FIG. 1 is a block diagram showing a control apparatus for an elevator according to an embodiment of this invention.

Now, an embodiment of this invention will be described with reference to FIG. 1, FIG. 2, and FIGS. 3(a) and 3(b). Referring to FIG. 1, the embodiment comprises a three-phase A-C power source 1, a circuit breaker 2, a converter 3 which converts a three-phase alternating current into direct current, a smoothing capacitor 4 which smooths the direct current, an inverter 5 which inverts the smoothed direct current into an alternating current of variable voltage and variable frequency, a current transformer 6 which detects the charging current of the smoothing capacitor 4 and generates a signal $I_c$, a hoisting induction motor 7, a sheave 8, a hoisting rope 9, the cage 10 of an elevator, a counterweight 11, and a tachometer generator 12 which serves to detect the rotating speed of the motor 7. The embodiment further comprises a speed command device 13 which provides a command for the running speed of the cage 10, an adder 14 which generates the error signal between the running speed command and the actual rotating speed of the motor 7, a slip control device 15 which generates a slip frequency command signal $f_s$ on the basis of the error signal, an adder 16 which serves to add the slip frequency command signal $f_s$ and the output signal of the tachometer generator 12, a voltage command (I) 17 which gives a command for an inverter voltage in a powering mode, a frequency command (I) 18 which gives a command for an inverter frequency in the powering mode, a voltage command (II) 19 which gives a command for an inverter voltage in a regenerative mode, a frequency command (II) 20 which gives a command for an inverter frequency in the regenerative mode, an inverter control device 21 which supplies the inverter 5 with a switching command, and a switching device 22 which changes-over the voltage commands 17 and 19 and the frequency commands 18 and 20, and which has change-over contacts 22A and 22B.

Figure 2:
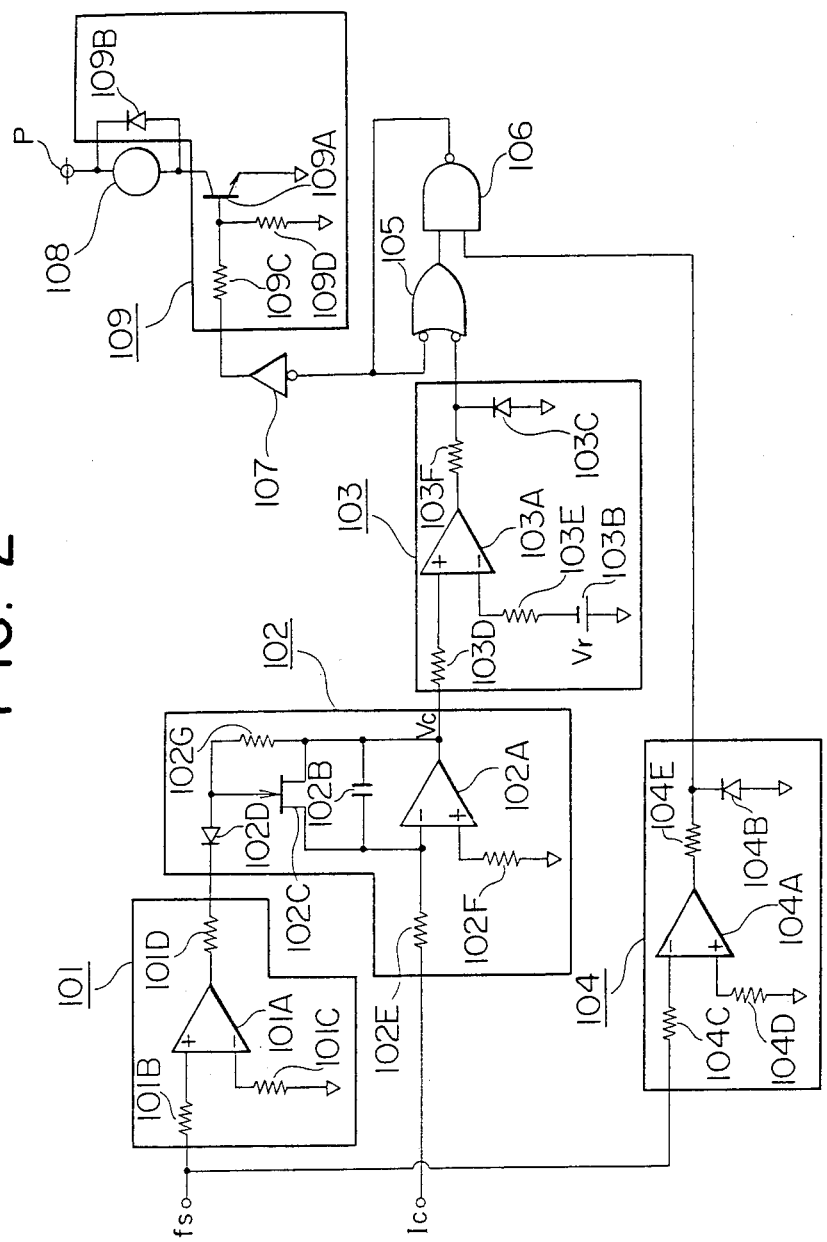
FIG. 2 is a circuit diagram showing the arrangement of a switching device for use in the embodiment.

FIG. 2 is a diagram showing the arrangement of the switching device 22. In the figure, numeral 101 designates a comparator which is constructed of an operational amplifier 101A and resistors 101B–101D. A resettable integrator 102 is constructed of an operational amplifier 102A, a capacitor 102B, an FET (field-effect transistor) 102C, a diode 102D and resistors 102E–102G. A comparator 103 is constructed of an operational amplifier 103A, a reference potential 103B, a diode 103C and resistors 103D–103F. A comparator 104 is constructed of an operational amplifier 104A, a diode 104B and resistors 104C–104E. Numerals 105 and 106 indicate NAND gates, numeral 107 indicates an inverter gate, and numeral 108 indicates a relay coil for driving the aforementioned contacts 22A and 22B. A driver circuit 109 for the relay coil 108 is constructed of a transistor 109A, a diode 109B and resistors 109C, 109D. Letter P denotes the plus terminal of a power source, and letter O the zero volt of the power source.

The speed command generated by the speed command device 13 and the actual speed signal generated by the tachometer generator 12 are compared by the adder 14, which delivers the error signal between the two. This error signal is calculated and amplified by the slip control device 15, whereby the slip frequency command signal $f_s$ is generated. This signal $f_s$ corresponds to the torque command signal of the motor. In the powering mode of the elevator, both the contacts 22A and 22B are set to sides a as will be described later, so that the slip frequency command signal $f_s$ and the actual speed signal produced by the tachometer generator 12 are added by the adder 16. Further, the voltage command 17 and frequency command 18 provide the commands of the inverter voltage and inverter frequency, respectively, of the inverter control device 21, on the basis of the output of the adder 16 so as to satisfy the relation in which the ratio of voltage/frequency is substantially constant. In accordance with these commands, the inverter control device 21 operates to supply the inverter 5 with the switching command. Thus, the motor 7 rotates, and the cage 10 runs and has its speed controlled precisely.

Figure 4:
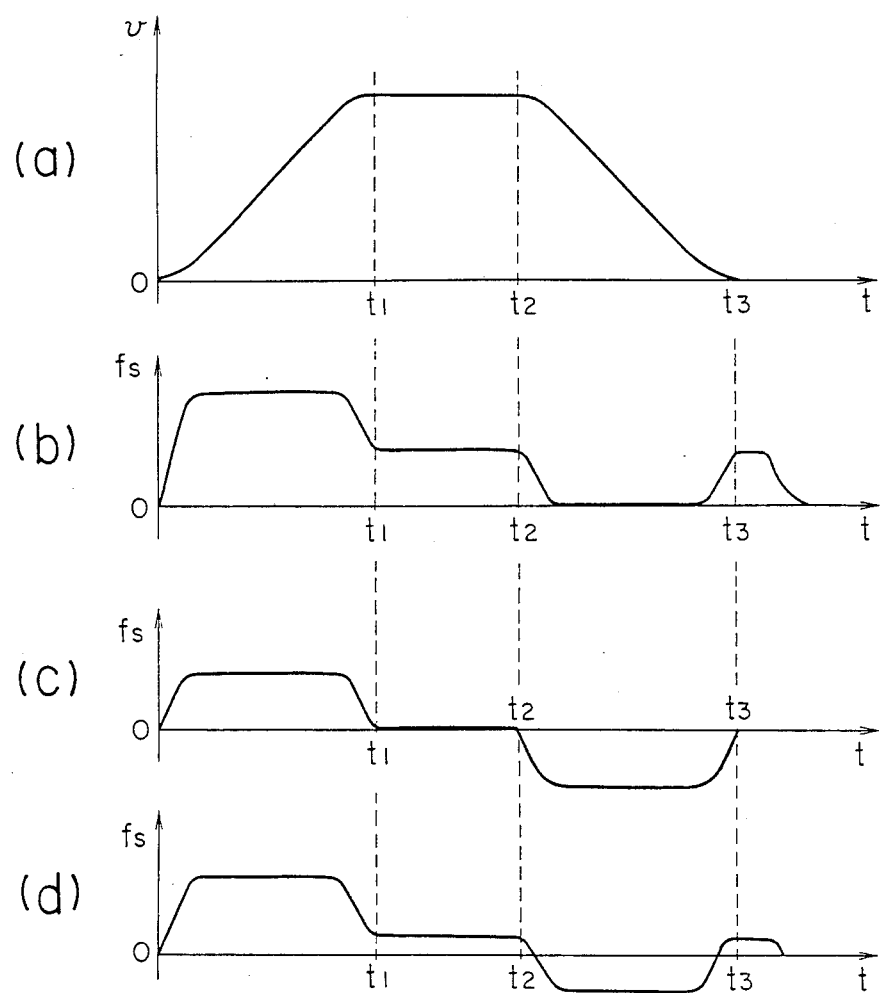
FIG. 4(a) is a characteristic diagram showing the relationship between the operating speed of an elevator and a slip frequency command signal.
FIGS. 4(b)–4(d) are characteristic diagrams showing the relationships between the slip frequency command signal and the operation time of a motor as based on the movable load conditions of an elevator cage.

When, as illustrated in FIG. 4(d), the slip frequency command signal $f_s$ changes-over from plus to minus in the running of the cage, that is, the powering mode changes-over to the regenerative mode, the contacts 22A and 22B are transferred to sides b as will be described later. As a result, the voltage command 19 and frequency command 20 operate to determine the inverter voltage and inverter frequency respectively to the end of consuming regenerative power within the motor by the use of the method described in Japanese patent application Laid-open No. 59-17879. In this way, also during the regenerative braking, the running speed of the cage is precisely controlled in accordance with the speed command produced by the speed command device 13.

Next, the switching control from the powering mode to the regeneration mode according to the present invention will be described with reference to FIG. 2. During the powering mode, the slip frequency command signal $f_s$ is plus, and hence, the output of the comparator 101 is plus. The FET 102C is thus turned 'on', so that the integrator 102 is held reset. In addition, the output of the comparator 104 is "L" (a low level). Therefore, the output of the NAND gate 106 is "H" (a high level), the output of the inverter gate 107 is "L", the transistor 109A is turned 'off', and the relay coil 108 is deenergized, so that the contacts 22A and 22B are held set to the sides a.

When the elevator enters a regenerative braking region and the slip frequency command signal $f_s$ becomes minus, the output of the comparator 101 becomes minus, and the FET 102C is turned 'off' to validate the integrator 102. At the same time, the output of the comparator 104 becomes "H". The motor 7 begins to generate regenerative power. When the regenerative power is fed back to the D-C side through the inverter 5, the smoothing capacitor 4 begins to be charged therewith. The charging current of the smoothing capacitor 4 is detected by the current transformer 6, so that the signal $I_c$ comes to have a plus value. The current signal $I_c$ is integrated by the integrator 102, and when the output voltage $V_c$ of the integrator becomes less than the voltage $-V_r$ of the reference potential 103B, the output of the comparator 103 becomes "L". As a result, the output of the NAND gate 105 becomes "H", that of the NAND gate 106 "L", and that of the inverter gate 107 "H". Then, the transistor 109A is turned 'on' to energize the relay coil 108, so that both the contacts 22A and 22B are set to the sides b.

Figure 3:
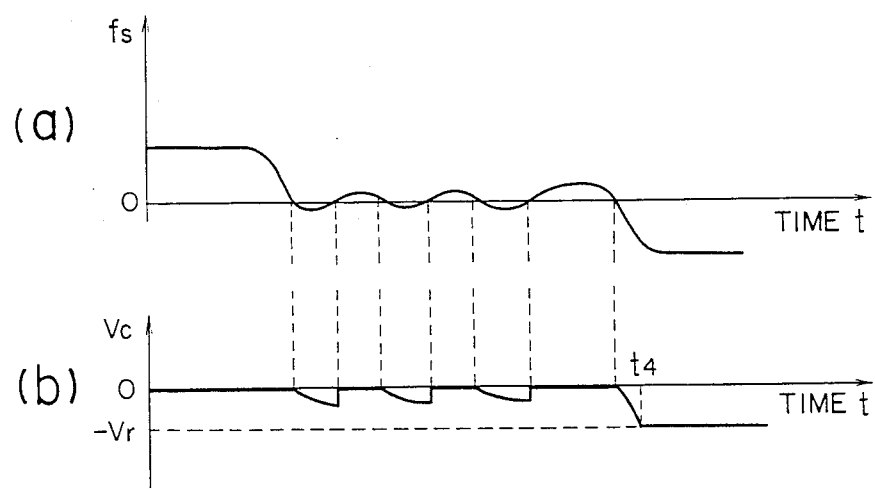

Accordingly, even in a case where the slip frequency command signal $f_s$ has continued to be zero or near zero as shown in FIG. 3(a), the output voltage $V_c$ of the integrator 102 becomes as shown in FIG. 3(b), and the powering mode is changed-over to the regenerative mode only after the voltage $V_c$ has become less than the voltage $-V_r$ reference potential 103B at a time $t=t_4$. In this way, even when the slip frequency command signal $f_s$ continues to be zero, it is possible to avoid the situation in which the change-over between the powering and the regeneration arises frequently.

After the change-over to the regenerative mode, only reactive power is supplied from the smoothing capacitor 4 to the inverter 5. Therefore, the mean value of the current signal $I_c$ becomes zero, and the output voltage $V_c$ of the integrator 102 becomes a fixed value. However, once the powering mode has changed-over to the regenerative mode, the latter is self-held by the NAND gates 105 and 106. The regenerative mode state is therefore held until the slip frequency command signal $f_s$ becomes plus again.

Moreover, the change-over from the powering mode to the regenerative mode is done upon detecting the charging current of the smoothing capacitor 4 by means of the current transformer 6. Therefore, when the quantity of the regenerative power is large, the change-over to the regenerative mode is done early, and no idle time develops. Accordingly, a torque change attributed to the change-over can be restrained to the minimum, so that the comfortable ride of the elevator is not deteriorated.

As described above, according to this invention, in case of controlling the torque of a motor with a slip frequency command in the powering mode of the motor and disposing of regenerative power within the motor in the regenerative mode, the powering is changed-over to the regeneration mode upon detecting the charging current of a smoothing capacitor. Therefore, the powering and the regeneration modes are prevented from being changed-over alternately and frequently, and a change-over with no idle time becomes possible. These are effective to enhance the ride provided in an elevator.

What is claimed is:

1. In an elevator driven by an induction motor and having a slip control device for generating a slip frequency command signal on the basis of an error between a speed command value and a running speed value of the induction motor so as to control a VVVF type inverter which in turn provides a corresponding alternating current of variable voltage and frequency, said inverter having a smoothing capacitor on a D-C side thereof, a control apparatus for stabilizing torque of the induction motor by smoothly changing operation of the induction motor from a powering mode to a regenerative mode, said control apparatus comprising:

a current detector for detecting charging current of the smoothing capacitor, and a switching device having a portion for detecting polarity of the slip frequency command signal and means responsive to the charging current detected by said current detector and the slip frequency command signal generated by said slip control device for changing operation of the induction motor from the powering mode to the regenerative mode only when a voltage value based on the charging current has exceeded a preset reference voltage value after a negative sign of the slip frequency command signal is detected by the polarity detection portion.

2. A control apparatus for an elevator according to claim 1 wherein said polarity detection portion comprises a comparator which compares the slip frequency command signal generated by the slip control device with a predetermined reference value and generates an output expressing whether the command signal is positive or negative.

3. A control apparatus for an elevator according to claim 2 wherein said switching device further comprises an integrator for integrating the charging current detected by said current detector and for generating an integral output representative thereof, a comparator for comparing said integral output of said integrator with a predetermined reference value so as to generate an output when the integral output of said integrator exceeds the predetermined reference value, and switching means for changing the operation of the induction motor in response to the output of said comparator.

4. A control apparatus for an elevator according to claim 3 wherein the integral output of said integrator is held in a reset state when a positive sign of the slip frequency command signal is detected by said polarity detection means.

5. A control apparatus for an elevator according to claim 3 wherein said switching device further comprises gate means operable responsive to the output of said comparator and the negative sign detection of the slip frequency command signal by said polarity detection portion so as to operate and maintain the induction motor in the regenerative mode.

6. A control apparatus for an elevator according to claim 3 wherein said current detector takes the form of a current transformer supplying an output of a magnitude proportional to a magnitude of the detected charging current to said integrator of said switching device.

7. A control apparatus for an elevator according to claim 1 wherein, when the induction motor operates in the regenerative mode, the slip control device performs a slip frequency control so as to consume regenerative power within said motor.

* * * * *